United States Patent
Cavallini et al.

(10) Patent No.: US 7,070,827 B2
(45) Date of Patent: Jul. 4, 2006

(54) VEGETABLE PROTEIN MEAT ANALOG

(75) Inventors: Vincent Cavallini, Wayzata, MN (US); Paul G. Hargarten, Auburn, IN (US); John Joehnke, Beder (DK)

(73) Assignee: Solae, LLC, St. Louis, MO (US)

( * ) Notice: Subject to any disclaimer, the term of this patent is extended or adjusted under 35 U.S.C. 154(b) by 0 days.

(21) Appl. No.: 10/877,744

(22) Filed: Jun. 25, 2004

(65) Prior Publication Data

US 2005/0003071 A1    Jan. 6, 2005

Related U.S. Application Data

(60) Provisional application No. 60/484,724, filed on Jul. 3, 2003.

(51) Int. Cl.
*A23J 3/14*    (2006.01)

(52) U.S. Cl. ...................................... 426/656; 426/574

(58) Field of Classification Search ................. 426/656, 426/574
See application file for complete search history.

(56) References Cited

U.S. PATENT DOCUMENTS

| | | | |
|---|---|---|---|
| 3,944,676 A | 3/1976 | Fridman et al. | 426/46 |
| 4,057,656 A | 11/1977 | Spiel | 426/630 |
| 4,125,630 A * | 11/1978 | Orthoefer | 426/104 |
| 4,746,521 A | 5/1988 | Niwano et al. | 426/241 |
| 4,943,441 A | 7/1990 | McCabe | 426/511 |
| 5,068,117 A | 11/1991 | McCabe | 426/511 |
| 5,160,758 A * | 11/1992 | Parks et al. | 426/506 |
| 5,482,730 A * | 1/1996 | Duve | 426/646 |
| 5,663,058 A | 9/1997 | Miyazaki et al. | 435/68.1 |

* cited by examiner

*Primary Examiner*—Anthony Weier
(74) *Attorney, Agent, or Firm*—James L. Cordek; Holly M. Amjad; Cary A. Levitt

(57) ABSTRACT

The present invention relates to a process for making a vegetable base meat analog, which may be used in a variety of vegetarian food products, such as burger patties and sausages. The process of the present invention involves sequentially blending methyl cellulose into a water/ice mix to form a cream, then blending in a modified gluten, a vegetable protein product having high solubility in water and capable of forming a gel with mild heat treatment, an oil to make an emulsion base, and a modified food starch and flavoring ingredients to form a flavored emulsion base. The flavored emulsion base may be stuffed into casings, and then cooked. The flavored emulsion base, once cooked, is a vegetable base meat analog and has a high resemblance to processed meat products having improved handling properties. The addition of the flavored emulsion base and the vegetable base meat analog in vegetarian food products improves the texture, mouthfeel, and juiciness of the resulting products.

12 Claims, No Drawings

VEGETABLE PROTEIN MEAT ANALOG

CROSS-REFERENCE TO RELATED APPLICATION

This application is related to and claims the benefit under 35 USC §119(e) of U.S. Provisional Patent Application Ser. No. 60/484,724, titled SOY PROTEIN MEAT ANALOG, filed Jul. 3, 2003.

BACKGROUND OF THE INVENTION

1. Field of the Invention

The present invention relates to vegetable protein products, and more particularly to a process for making a vegetable base meat analog.

A ground meat pattie, when cooked by baking, grilling or pan frying loses much of its moisture and undergoes a substantial weight loss. This weight loss results in a obvious shrinkage of the cooked meat product. The total moisture loss in any meat due to the cooking out of the natural juices is an inevitable consequence of the cooking process and largely depends upon the degree of cooking.

Recent trends in food consumption show that people are becoming more health conscious and monitoring their food intake as the result of recent research into the possible effects of particular foodstuffs on health. Animal products are the only dietary source of cholesterol and may contain high levels of saturated fats. This has led large numbers of health professionals to recommend that the public significantly reduce their intake of red meats. Fish and poultry have become popular substitutes, but vegetable protein also is increasing in popularity. Generally, vegetable protein is eaten in the form of beans or other natural products alone or mixed with animal foodstuffs, but enriched sources such as flours, concentrates and isolates of defatted oilseed, especially soy, have been developed for use as food ingredients.

2. Description of the Related Art

Vegetable protein based meat analog products or gelling food products, for example, cheese and yogurt, offer many health benefits to consumers. Consumer acceptance of these products is directly related to organoleptic qualities such as texture, flavor, mouthfeel and appearance. Attempts have been made to produce vegetable protein products that may be used as meat substitutes. For example, U.S. Pat. No. 4,057,656 discloses a method for preparing quick cooking food products which are palatable, bland, light colored, meat-like in texture, chewable chunks when hydrated. The method involves pressing plant protein material containing 30 percent or higher protein, 5 to 10 percent moisture and NSI of about 30 to 70 at a temperature sufficient to convert the moisture into steam. As a result, the plant protein material is rendered partially or substantially bland.

U.S. Pat. Nos. 4,943,441 and 5,068,117 disclose methods of processing whole soybeans to produce discrete, irregularly-shaped chunks or pieces of textured proteinaceous material which are free from off flavors and odors and have a meat-like texture and appearance. The methods involve acidifying whole soybeans and grinding in aqueous medium to provide an aqueous slurry or dough of soybean particles, which is passed through high temperature pressurized steam under conditions which effect texturization of the soy protein in the form of discrete chunks or pieces. The texturized pieces are dried and re-hydrated for use in a wide variety of food products. Additives such as flavoring, coloring, fat, seasoning and other proteinaceous materials may be incorporated in the texturized soy protein pieces.

The above-mentioned meat-like vegetable protein products may not be suitable as protein sources for gel-based food products like those useful in pickling brines, which must have good gel forming properties at relatively low cooking temperatures and good water and fat binding properties. Typically, vegetable proteins and combinations of vegetable proteins such as vital wheat gluten and soy protein isolate will form viscous mixes, prior to cooking, which are difficult to handle in pumping and forming equipment. Also, the cooked products from these protein sources are typically significantly different in chewiness or "bite" from the natural texture of processed meat products or gelled food products.

U.S. Pat. No. 5,663,058 discloses a process for producing a soybean protein material having taste, color and water-dispersibility suitable for use as a pickling solution at high concentrations and in viscous liquid foods such as soup. The process comprises the steps of hydrolyzing soybean protein, emulsifying an oil-and-fat ingredient with the soybean protein and drying the mixture.

There is a need for a better quality vegetable protein meat analog, that can be used in a wide variety of vegetarian food products.

SUMMARY OF THE INVENTION

The present invention relates to a process for making a vegetable base meat analog comprising the steps of:
  adding methyl cellulose into a water/ice mix and sequentially blending methyl cellulose and water/ice mix to form a cream;
  blending in a modified gluten;
  blending in a vegetable protein product having high solubility in water and capable of forming a gel with mild heat treatment, forming a protein mixture;
  blending in oil to make an emulsion base;
  blending in a modified food starch and flavoring ingredients to form a flavored emulsion base; and
  cooking the flavored emulsion base to make a vegetable base meat analog.

Alternatively, the flavored emulsion base is stuffed into water impermeable casings prior to the cooking step.

The invention also relates to a process for making vegetable burger patties comprising the steps of:
  mixing vegetable base meat analog pieces with at least one food binding component, flavored emulsion base, methyl cellulose, a carrageenan gel mixture, and flavoring ingredients; and
  shaping the mixture into patties.

DETAILED DESCRIPTION

Vegetable burger patties satisfy the health conscious needs of consumers. However, typically vegetable burger patties are made in a "one step" process and as such, when these patties are cooked, there is a significant weight loss since the moisture, as water, is cooked out. This invention relates to a "two step" process wherein in the first step a flavored emulsion base and a vegetable base meat analog are prepared. These two components from the first step are combined in the second step with other components to produce a pattie that maintains much of its original weight upon cooking. As such, a pattie made by the two step process of the present invention is juicier than a pattie made by a one step process.

In one embodiment of the present invention, the process for making the vegetable base meat analog includes the steps of: adding methyl cellulose into a water/ice mix and sequentially blending methyl cellulose and water/ice mix to form a cream; blending in a modified gluten, blending in a vegetable protein product having high solubility in water and capable of forming a gel with mild heat treatment forming a protein mixture; blending in an oil to form an emulsion base; blending in a modified food starch and flavoring ingredients; to form a flavored emulsion base; and cooking the flavored emulsion base to produce a vegetable base meat analog. Alternatively, the flavored emulsion base is stuffed into water impermeable casings prior to the cooking step.

A suitable modified gluten includes vital wheat gluten. The vegetable protein product is derived from soy or other plant protein such as corn, or dry beans. The modified food starch, which serves as a thickening component, is derived from any plant such as corn, potato or rice. Any vegetable oil such as soybean oil, canola oil, corn oil, or peanut oil is suitable. The flavoring ingredients comprise at least one of a sweetener, spice, salt, beef flavor, garlic powder, or a coloring dye. The flavored emulsion base contains the vegetable protein product, oil, modified food starch, methyl cellulose, and flavoring ingredients.

In one specific embodiment, the step of cooking involves heating to a temperature of about 87.8° C. (190° F.) to about 90.6° C. (195° F.).

In another embodiment, the process of the present invention includes the steps of cooling the vegetable base meat analog to about 4.4° C. (40° F.); and grinding the cooked vegetable base meat analog into vegetable base meat analog pieces or particles. The vegetable base meat analog pieces may have any desired sizes. Preferably the pieces have a diameter of about 3 to 12 millimeters.

The present invention further provides a vegetable base meat analog or the vegetable base meat analog pieces produced according to the process described herein.

In another embodiment, the process of the invention includes the step of producing vegetable burger patties, by mixing the vegetable base meat analog pieces with at least one food binding component, flavored emulsion base, methyl cellulose, carrageenan gel, and flavoring ingredients; and shaping the mixture into patties. An example of a food binding component includes a soy concentrate.

The present invention includes vegetable burger patties and vegetarian sausages prepared according to the process described herein.

The embodiment disclosed below is not intended to be exhaustive or limit the invention to the precise form disclosed in the following detailed description. Rather, the embodiment is chosen and described so that others skilled in the art may utilize its teachings.

The present invention relates to a process for making a vegetable base meat analog that has meat-like texture, and improved mouthfeel and juiciness. The vegetable base meat analog is made from a vegetable protein product that is highly water soluble, highly dispersible, and capable of forming a gel at a low heat treatment. The characteristics of complete gel formation at temperatures relevant for meat pasteurization generates a very firm and cohesive overall meat structure, excellently suited for slicing. Specifically, the vegetable protein product forms a gel at a temperature of between 60 and 105° C., preferably at a temperature of between 70 and 90° C. It has a protein content between 60% and 82% moisture free basis, and an NSI (nitrogen solubility index) of between 50 and 100. Further, the vegetable protein product is characterized by having a viscosity of 5–50 centipoises, preferably 5–25 centipoises, measured on a 10% dispersion by weight, in water. Preferably the vegetable protein product is derived from soy or other plant protein such as canola, peanuts or dry beans. Any known method may be used to product such vegetable protein product. For example, U.S. patent application Ser. No. 10/050,432, hereby fully incorporated by reference, discloses a method comprising the steps of: dispersing a purified protein having high PDI (Protein Dispersibility Index) in water around neutral pH; extracting the dispersion; removing the insoluble fraction; optionally lowering the pH of the supernatant fraction to 5.0; neutralizing; optionally removing low molecular weight solubles by ultra filtration; treating the vegetable protein product, optionally in a jet cooker; cooling; and spray drying. The dried vegetable protein product can then be used in the process of making the vegetable base meat analog.

The process of the present invention involves first adding 1–3 wt. % methyl cellulose to a 45–65 wt. % water/ice mix and blending the methyl cellulose and water/ice mix until the blend has a consistency of a shaving cream. The water/ice mix contains about equal amounts of water and ice. Other proportions of water and ice may also be suitable as long as the temperature during the process is kept below the point in which the mixture becomes hardened. Blending is accomplished by using any commercially available blender or bowl cutter. The blending process may be initiated with a low chopping speed to prevent spilling over. After methylcellulose is fully dispersed, the chopping speed may be increased. Chopping continues at a high speed until a creamy blend is obtained.

Then, 3–10 wt. % of modified gluten such as vital wheat gluten (Midwest Grain Products, Inc., Atchison, Kans.) is added to the methylcellulose cream. Chopping continues in the same manner as described above for a few minutes until all the gluten is blended well in the cream.

Next, 10–20 wt. % of a vegetable protein product with high water solubility and further, the capability of forming a gel with mild heat treatment, as describe above, is blended into the methylcellulose cream to form a protein mixture. A suitable vegetable protein product that has utility in the present invention is Alpha® 5800 soy protein concentrate, available from Solae, St. Louis, Mo. 63188. Preferably the vegetable protein product may also have high dispersibility such as Alpha® 5812 soy protein concentrate. Chopping may be continued for a few minutes until the vegetable protein product is dispersed, and well blended.

The next step is to add 10–15 wt. % oil into the methyl cellulose cream to produce an emulsion base. Suitable oils comprise soy oil, canola oil, corn oil, or peanut oil. Chopping continues in the manner set forth above.

The following step is to blend in 5–10 wt. % of a modified starch followed by 5–8 wt. % of flavoring ingredients comprising a sweetener such as dextrose or sucrose, salt, spice, or food coloring. The flavoring ingredient may be added one at a time, while chopping continues as describe above. Additional water/ice mix may also be added to reduce stiffness of the flavored emulsion base. The flavored emulsion base is then stuffed into casings, which are either natural or artificial, edible or non-edible casings. Subsequently, the stuffed emulsion base may be cooked until the temperature of the core reaches 87.8° C. (190° F.) to about 90° C. (195° F.). The resulting product is an vegetable base meat analog that is easily sliceable.

The process of the present invention may include cooling the vegetable base meat analog to about 4.4° C. (40° F.), before slicing or grinding the cooked vegetable base meat analog into vegetable base meat analog pieces. Any desired sizes may be produced, depending on the desired type of food products. For making vegetarian burger patties, the vegetable base meat analog pieces have a diameter of about 3 to about 12 mm.

A specific example of the process for making a flavored emulsion base, vegetable base meat analog and vegetable base meat analog pieces is demonstrated in Example 1.

The present invention further provides a process for making vegetable burger patties, using both the flavored emulsion base and the vegetable base meat analog. Generally, the process involves mixing together 15–25 wt. % of the flavored emulsion base, 5–20 wt. % of the vegetable base meat analog pieces, 50–75 wt. % at least one food binding component, 0.1–1 wt. % of methyl cellulose, 7–12 wt. % of carrageenan gel mixture, and 0.01–0.25 wt. % of flavoring ingredients. The vegetable burger mixture is subsequently shaped into patties, having any desired sizes.

Known food binding components comprise cracker crumbs, toasted wheat crumbs, modified starches, milk proteins, wheat flour, or a protein concentrate. In a specific formula demonstrated in Example 2, extruded products of protein concentrate of Solae, St. Louis, Mo. 63188 (originally Central Soya, Fort Wayne, Ind.) having registered names: RESPONSE® 4402 soy protein concentrate and RESPONSE® 4320 soy protein concentrate are used as food binding components. RESPONSE 4402 and RESPONSE 4320 are granular in structure, with a 70% protein content. Adding these protein products to the formula improves the texture of the burger and reduces flaring on gas grills.

The carrageenan gel mixture is a gel mixture that helps preserve the meat-like texture and juiciness of the burger patties. The carrageenan gel mixture may be prepared using a variety of formulas. A specific example of the process for making carrageenan gel mixture is demonstrated in EXAMPLE 3. The burger patties may be par fried for about 30 seconds in 176.7° C. (350° F.) cooking oil. The cooking temperature and cooking time vary according to the thickness of the patties. The cooking oil is any suitable vegetable oil including corn oil and peanut oil.

Further, the present invention provides a process for making vegetarian sausage. This instant process follows relatively the same steps as described for the process of making the flavored emulsion base meat. However, relatively more water/ice mix is used in the initial step of blending methylcellulose into water/ice mix (about 98% of total water/ice mix) is used. The rest of the water/ice mix is added with the dry ingredients.

After blending the gluten into the methylcellulose cream, a vegetable protein product, a modified starch, an oil, and flavoring ingredients are added according to the steps described for making the emulsion base meat analog. The flavored emulsion base is then stuffed into sausage casings.

An example of a specific process for making vegetarian sausage is demonstrated in Example 4. According to Example 4, the modified starch used in this instant process is POLARTEX 06734, which is a product of Cargill, Minneapolis, Minn. POLARTEX 06734 is a stable modified cornstarch that is used as a thickener. Further, the flavoring ingredients include beef flavor 535557 (Givaudan Roure, Cincinnati, Ohio).

The present invention is outlined in the following examples, which are only an illustration and which are in no way meant to limit the scope of the invention. It is to be understood that the formula provided herein may be modified in many ways. For example, the amounts of oil or flavoring ingredients may vary. Some flavoring ingredients may be omitted or additional flavors may be added. For instance, a chicken or a pork flavor may replace the beef flavor.

EXAMPLE 1

Process and Formula for Making an Emulsion Base Meat Analog

A water/ice mix is first prepared by adding equal amounts of ice and water together to make a 50/50 water/ice mix. The total amount of the water/ice mix required and amounts of ingredients in this example is calculated based on the formula presented in Table I. About 90% of total amount of water/ice mix is added to a bowl cutter (Meissner cutter), followed by 1.5 wt. % of methylcellulose. It is preferred that methylcellulose with a high gelling property, such as METHOCEL of Dow Chemical Co., Midland, Mich., be used. Chopping motion is initiated at a low knife speed, until the methylcellulose is fully dispersed. Then, the knife speed is increased to a full speed or about 3600 rpm. After 3–5 minutes, methylcellulose increases in volume and has a consistency similar to a shaving cream. A calculated amount of vital wheat gluten as indicated in Table I is added to the methylcellulose cream. Chopping starts at a low knife speed and increases to a full speed after the vital wheat gluten is completely dispersed. Chopping continues for approximately 2–4 minutes. Then, a calculated amount (16 wt. %) of vegetable protein product is blended into the protein mixture with the chopping motion. Preferably, the vegetable protein product has high water solubility and is capable of forming a gel with mild heat treatment. After approximately 2–3 minutes, 12.5 wt. % of soy oil or canola oil is added. Other oils such as corn oil and peanut oil may also be used. Chopping continues at a low speed until the oil is completely dispersed, and at a full speed until a homogenous mixture is formed. Then, all other dry ingredients, including the 2.50 wt. % of modified starch (B990), 0.50 wt. % of Dextrose, 5.0 wt. % of spice and 0.25 wt. % of coloring material are added, one by one, with the rest of the water/ice mix (10%). Chopping continues under vacuum, for about 3–4 minutes, or until a homogeneous mixture of flavored emulsion base is obtained. The flavored emulsion base may be placed in a water tight container or stuffed into moisture impermeable casings, which may be made of plastic or cellulose. The flavored emulsion base may be cooked in an oil bath continuous oven until the core temperature reaches about 87.8° C. (190° F.) to about 90.6° C. (195° F.). The cooked product may be subsequently cooled to about 4.4° C. (40° F.), before the casings are removed. The cooked vegetable base meat analog may be sliced or chopped to small particles, preferably, about 3 to 12 mm in diameter to give vegetable base meat analog pieces. The flavored emulsion base or vegetable base meat analog pieces may be incorporated into a variety of vegetarian food products to improve the texture, mouthfeel and juiciness of the vegetarian food products.

TABLE I

Formula for making a flavor emulsion base/ vegetable base meat analog.

| Ingredients | wt. % |
| --- | --- |
| Ice/Water | 55.75 |
| Vegetable Protein Product | 16.0 |

TABLE I-continued

Formula for making a flavor emulsion base/
vegetable base meat analog.

| Ingredients | wt. % |
|---|---|
| Vital Wheat Gluten[1] | 6.0 |
| Soy/canola salad oil | 12.5 |
| Modified Starch B990[2] | 2.5 |
| Dextrose | 0.5 |
| Methylcellulose[3] | 1.5 |
| Spice | 5.0 |
| Color | 0.25 |
| Total | 100.0 |

[1]Midwest Grain Products, Inc.,
[2]Grain Processing Corp.,
[3]Dow Chemical Co., Midland, MI

EXAMPLE 2

Process and Formula for Making Vegetable Burger Patties

Dry extruded soy protein concentrates such as RESPONSE 4402 and RESPONSE 4320 (registered soy protein products of Solae, originally Central Soya Co) are hydrated with water at a ratio of two parts water to one part soy protein product. Then 30 wt. % of hydrated RESPONSE 4402 and 30 wt. % of hydrated RESPONSE 4320 are mixed with 20 wt. % of the mixture of flavored emulsion base as prepared in Example 1. After the ingredients are mixed together, a calculated amount of methylcellulose (0.25 wt. %) is added to the mixture, along with the spice (see Table II). Then the vegetable base meat analog pieces produced by the process demonstrated in Example 1 are slowly added along with carrageenan gel mixture (see Example 3) to form a vegetable burger mixture. The vegetable burger mixture is then shaped into burger patties. Subsequently, the vegetable burger patties may be thoroughly cooked or par fried in 176.7° C. (350° F.) cooking oil for about 30 seconds, and immediately cooled down, frozen and packaged.

TABLE II

Formula for burger patties

| Ingredients | wt. % |
|---|---|
| Hydrated Response 4402 | 30.0 |
| Hydrated Response 4320 | 30.0 |
| Vegetable Base Meat Analog Pieces | 10.0 |
| Flavored Emulsion Base | 20.0 |
| Carrageenan Gel | 9.7 |
| Methylcellulose | 0.25 |
| Spice | 0.05 |
| Total | 100.0 |

EXAMPLE 3

Process and Formula for Making Carrageenan Gel Mixture

The process involves mixing together 1.0 wt. % of Danisco Carrageenan 860 (Danisco, Copenhagen, Denmark) with 0.35 wt. % of Danisco Locust Bean Gum, and 4.0 wt. % spice, and then adding 94.65 wt. % water. The mixture is heated to about 85° C. (185° F.) with continuous agitation. Then an amount of boiling water is added back to obtain the original 100 wt. %. The mixture may be cooled or refrigerated for about 24 hours to form a gel before adding to the emulsion base mixture as described in Example 2.

EXAMPLE 4

Process and Formula for Making Vegetarian Sausage

A calculate amount of water/ice (50/50) mix is prepared (see Table III). About 98 wt. % of total amount of water/ice mix is added to a bowl cutter, followed by 1.5 wt. % of high gelling methylcellulose. Chopping motion is initiated at a low knife speed, until methylcellulose is fully dispersed, after which the knife speed is increased to a full speed or about 3600 rpm. After 3–5 minutes, methylcellulose increases in volume, having a consistency similar to a shaving cream. About 6.0 wt. % of vital wheat gluten is added to the methylcellulose cream. Chopping starts at a low knife speed and increases to a full speed after the vital wheat gluten is completely dispersed. Chopping continues for approximately 2–4 minutes. Then, about 16.0 wt. % of a vegetable protein product is blended into the protein mixture with chopping in the manner described herein. Preferably, the protein product is a soy protein that has high solubility in water and capable of forming a gel with mild heat treatment. After approximately 2–3 minutes, 12.5 wt. % soy or canola oil is added. Chopping continues at a low speed until the oil is completely dispersed and then at a full speed until a homogenous mixture is formed. Then, all other dry ingredients, including 2.5 wt. % modified starch (C*Polartex 06734), 0.50 wt. % dextrose, 5.0 wt. % spice and 0.25 wt. % of coloring material are added, one by one. The rest of the water/ice mix (2%) is then added to soften the mixture. Chopping continues in the manner described herein, under vacuum (1–9 Bar), for about 3–4 minutes, or until a homogeneous mixture is obtained. The flavored emulsion base is stuffed into water impermeable or semi permeable casings which may be removed later, or any suitable edible sausage casings. The stuffed emulsion base may be cooked until the core temperature reaches 87.8° C. (190° F.) to about 90° C. (195° F.). The resulting product is an vegetable base sausage that has a meat-like texture and good mouthfeel.

TABLE III

Formula for a vegetarian sausage

| Ingredient | wt. % |
|---|---|
| Ice/Water | 57.55 |
| Vegetable Protein Product | 16.0 |
| Modified Gluten[1] | 6.0 |
| Soy/canola salad oil | 12.5 |
| C*Polartex 06734[2] | 2.5 |
| Dextrose | 0.5 |
| Methylcellulose | 1.5 |
| Beef Flavor 535557[3] | 2.75 |
| Salt | 0.5 |
| Garlic powder | 0.2 |
| Total | 100.0 |

[1]Midwest Grain Products, Inc.,
[2]Cerestar,
[3]Givaudan Roure

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A process for making a vegetable base meat analog comprising the steps of:
   adding methylcellulose into a water/ice mix and sequentially blending methyl cellulose and water/ice mix to form a cream;
   blending in a modified gluten;
   blending in a vegetable protein product comprising a soy protein concentrate having a protein content of between 60% and 82% on a moisture free basis and having high solubility in water and capable of forming a gel with mild heat treatment, forming a protein mixture;
   blending in oil to make an emulsion base;
   blending in a modified food starch and flavoring ingredients to form a flavored emulsion base; and
   cooking the flavored emulsion base to make a vegetable base meat analog;
   wherein the flavored emulsion base contains 1–3 wt. % methylcellulose, 45–65 wt. % water/ice mix, 3–10 wt. % modified gluten, 10–20 wt. % vegetable protein product, 10–15 wt. % oil, 5–10 wt. % modified food starch, and 5–8 wt. % flavoring ingredients.

2. The process of claim 1, further comprising the step of stuffing the flavored emulsion base into water impermeable casings prior to the step of cooking.

3. The process of claim 1, wherein the modified gluten includes vital wheat gluten.

4. The process of claim 1, wherein the vegetable protein product is derived from soy.

5. The process of claim 1, wherein the modified food starch includes cornstarch.

6. The process of claim 1, wherein the oil comprises at least one of soybean oil, canola oil, corn oil, or peanut oil.

7. The process of claim 1, wherein the flavoring ingredients comprise at least one of a sweetener, spice, salt, beef flavor, garlic powder, or a coloring dye.

8. The process of claim 1, wherein the ice/water mix contains equal volumes of ice and water.

9. The process of claim 1, wherein the flavoring ingredients comprise a sweetener, salt, spices, beef flavor, chicken flavor or pork flavor.

10. The process of claim 1, wherein the step of cooking involves heating to a temperature of about 87.8° C. (190° F.) to about 90.6° C. (195° F.).

11. The process of claim 10, further comprising the steps of:
    cooling the vegetable base meat analog to about 4.4° C. (40° F.); and
    grinding the vegetable base meat analog into vegetable base meat analog pieces.

12. The process of claims 11, wherein the meat analog pieces have diameters of about 3–12 mm.

* * * * *